UNITED STATES PATENT OFFICE.

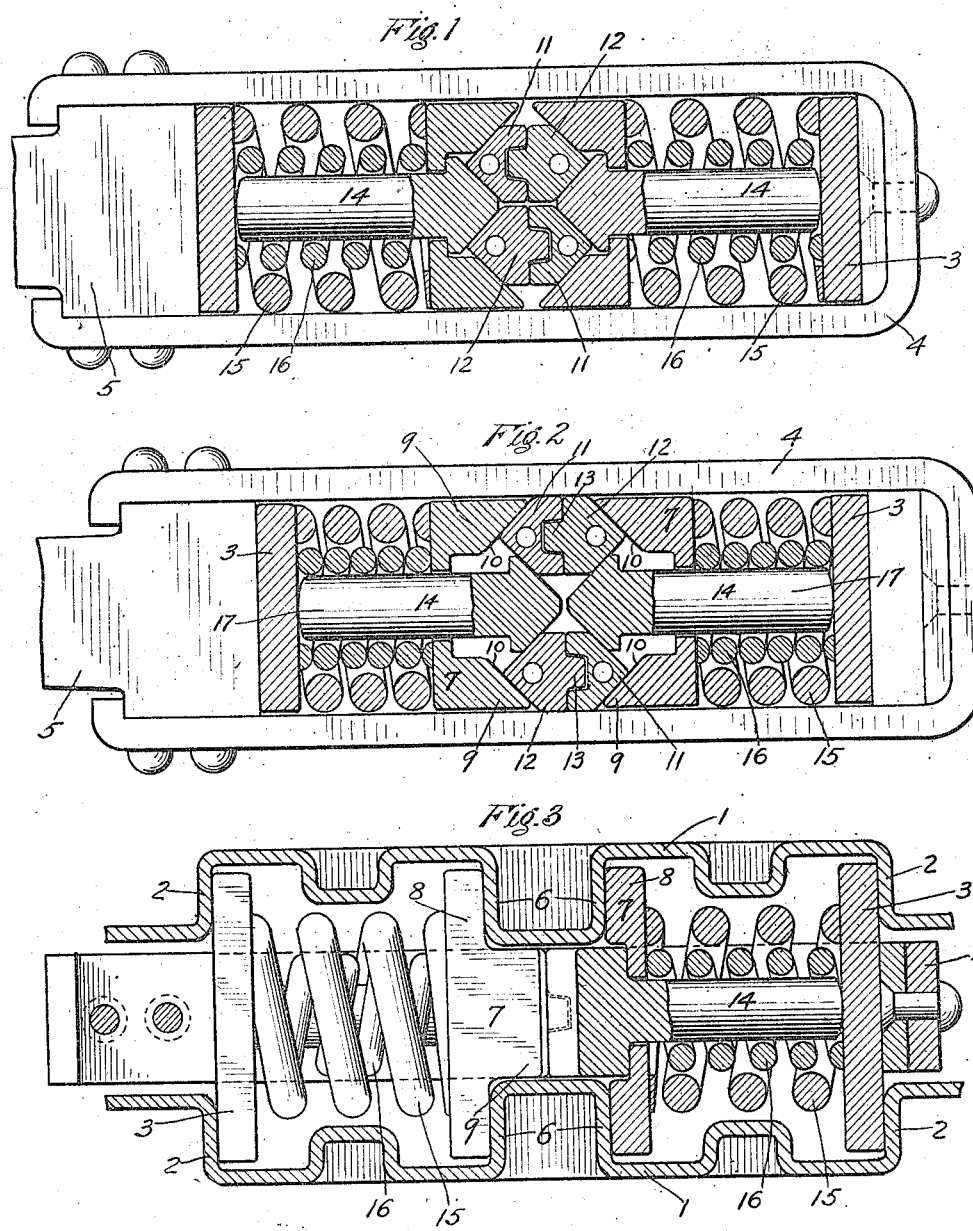

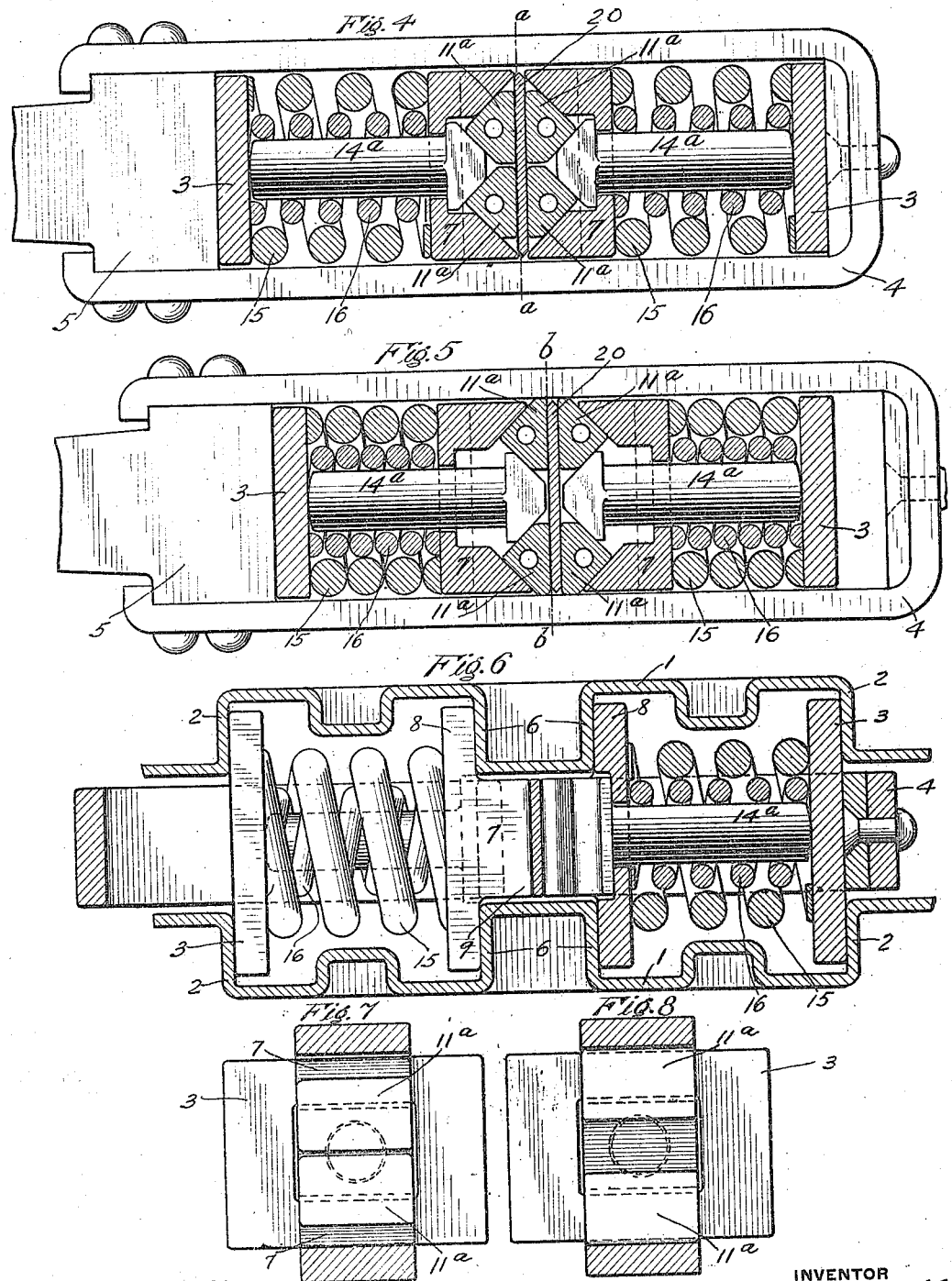

EDWARD W. NEWELL, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FRICTION DRAFT-GEAR.

1,141,138.  Specification of Letters Patent.  Patented June 1, 1915.

Application filed February 17, 1914. Serial No. 819,184.

*To all whom it may concern:*

Be it known that I, EDWARD W. NEWELL, a citizen of the United States, residing at Pittsburgh, in the county of Allegheny and State of Pennsylvania, have invented new and useful Improvements in Friction Draft-Gear, of which the following is a specification.

This invention relates to friction draft gear as employed more particularly on railway cars for absorbing and dissipating shocks due to buffing and draft stresses.

While the desirability of employing friction draft gear on railway cars is now well recognized, there are still a very large number of cars in service which are equipped with spring draft gear, particularly of that type known as the tandem spring gear.

Many cars so equipped are old types not designed to withstand the shocks incident to modern service especially where heavy steel cars of large capacity are mixed in trains with the older cars. The spring draft gear not being effective in absorbing such shocks, cars are continually being so damaged as to render them unfit for service.

While the evident remedy is to substitute a friction draft gear for the spring gear, it becomes a question of expense in applying such a gear as compared with the value and the resulting increased life of the car. It will thus be evident that it is highly desirable to provide a friction draft gear for the above conditions which may be cheaply constructed and easily applied with the least possible reconstruction of the existing mechanism and this is one of the objects of my invention.

Another object of my invention is to provide a friction draft gear adapted to be applied on cars equipped with the tandem spring gear, in which many parts of the old spring gear may be utilized in the friction draft gear without alteration.

Another object of my invention is to provide a friction draft gear for replacing a tandem spring gear in which the friction mechanism may be installed without taking up space occupied by the old draft springs.

Another object of my invention is to provide a friction draft gear of high capacity combined with a comparatively high release.

Another object of my invention is to reorganize the old tandem spring draft gear by removing the old intermediate cross piece in the yoke and utilizing the space thus provided for friction elements.

Another object of my invention is to provide a friction draft gear having facing central wedges adapted to engage the usual end followers, a friction element movable to compress the draft spring and wedge blocks intermediate the central wedges for transmitting pressure from one central wedge to the friction element.

In starting long trains or where cars are subjected to stresses in quick succession, and also where cars are bunched at the bottom of grades, it is highly desirable to have a moderately high release as well as a high resisting capacity.

Other objects and advantages of my invention will be apparent in the following more detailed description of the invention.

In the accompanying drawings; Figure 1 is a side elevation, partly in vertical section, of a friction draft gear embodying my improvements and showing the parts in normal position; Fig. 2 a similar view, showing the parts in the positions assumed under stress; Fig. 3 a plan view thereof, partly in horizontal section; Fig. 4 a side elevation, partly in section, of a slightly modified form of friction draft gear embodying my invention and showing the parts in normal position; Fig. 5 a similar view, showing the parts in the positions assumed under stress; Fig. 6 a plan view thereof, partly in section; Fig. 7 a transverse section on the line *a—a* of Fig. 4; and Fig. 8 a transverse section on the line *b—b* of Fig. 5.

The usual tandem spring gear employs side plates 1—1 secured to the car center sills and provided at opposite ends with stops 2—2 for follower plates 3—3, and the usual yoke 4, secured to the draw-bar 5, incloses the gear. Centrally, the side plates 1—1 are provided with follower stops 6—6 forming a restricted throat within which, in the usual tandem draft gear, an abutment secured to the yoke 4 is mounted.

According to my invention, as shown in Figs. 1, 2, and 3, in place of the usual intermediate follower plates, combined followers plates and friction elements 7—7 are provided, each comprising a portion 8 of the same thickness as the usual follower plate and adapted to bear against the stops 6—6 and a central inwardly projecting portion 9 adapted to extend into the restricted throat of the side plates 1—1. The projecting portion 9 is recessed to provide opposite inclined friction faces 10—10 and in the space formed by said inclined faces and within the throat of the side plates 1—1 are mounted wedge block elements, each preferably comprising a pair of friction blocks 11 and 12, and in the form shown in Figs. 1, 2, and 3, the block 11 has a recess for receiving a projection 13 on the cooperating block 12.

Each of the friction blocks 11 and 12 is provided with opposite inclined friction faces, the outer faces for engaging the friction faces 10—10 of the members 7—7 and the inner faces for engaging opposite inclined friction faces of opposing centrally arranged plunger wedges 14—14.

Interposed between the front and rear followers 3—3 and the intermediate followers 7 are the usual draft gear springs 15 and 16, the smaller spring 16 being nested within the larger spring 15 in accordance with the usual practice, but since the springs act together, they may for the purpose of this invention be treated as a unit. Each plunger wedge 14 is provided with a stem 17 extending through an aperture in the intermediate follower plate 7 and adapted to contact with one of the outer follower plates 3—3.

Fig. 1 shows the parts in normal position, with the wedge blocks 11 and 12 in a central position.

If a buffing stress is applied to the draw-bar, the follower plate 3 at the front is forced rearwardly and the front plunger wedge 14 also moves rearwardly while the rear plunger wedge 14 is held stationary by contact with the rear follower plate 3. The wedge blocks 11 and 12 on opposite sides of the longitudinal axis are thereupon forced longitudinally rearward and at the same time move out laterally.

In effect, the moving plunger wedge 14 forces each wedge block element diagonally through the parallel sided opening formed by the faces of the stationary member 7 and the stationary member 14, against the resistance of the springs 15 and 16 acting on the other member 7.

In draft, the rear follower plate 3 moves forward, while the front follower plate 3 is held stationary by the usual stops 2 and the front plunger wedge is also stationary. As in the case of buffing, the opposite pairs of wedge blocks 11 and 12 move longitudinally and laterally outward but in the opposite direction. The movement of the wedge blocks forces the forward intermediate follower plate 7 forward against the resistance of the forward draft springs 15 and 16.

The intermediate stops 6—6 are not necessary to the successful operation of the gear and if the gear is installed with side plates not provided with intermediate stops the gear will operate under buffing and draft stresses substantially the same as where the intermediate stops are present. In fact, the followers 7—7 need not bear on the stops 6—6 but may if desired be cut away so as to leave a clearance space between the stops and the followers.

In addition, it will be noted that the area of friction surface in contact increases in the movement of the gear, since at the start, the blocks 11 and 12 do not have full bearing contact with the friction faces of the intermediate follower plates 7—7, while upon movement the blocks gradually move to a position in which the full area of the friction faces is in contact.

It will be noted that in buffing one set of draft springs opposes the movement of the friction elements, while in draft the other set opposes movement and furthermore, the friction elements are always interposed between the point of application of the stress and the set of draft springs in action, so that direct impact on the springs is prevented, thus tending to obviate breakage and weakness of springs.

Another feature of the present draft gear consists in providing a high release. Referring to Fig. 2 of the drawings, it will be noted that in the release movement, the forward draft springs act directly on the forward follower plate 3, so that the full power of this set of springs is utilized to force the draw-bar and the coupler back to release position while the rear set of draft springs act on the rear intermediate follower 7 to force the wedge blocks back to normal position. As soon as the draw-bar starts to release, pressure is removed from the forward central plunger wedge 14 so that the same is free to fall back out of the way of the wedge blocks 11 and 12 as said blocks are moved inwardly by the forward movement of the rear intermediate follower 7.

In release after a draft stress, the action will be the same, except in the reverse direction, the rear set of springs then acting to directly move the draw-bar to release position, while the forward set of springs act to move the friction elements back to release position.

The opposing wedge blocks 11 and 12 are made with the plug and socket construction so that as the friction faces wear down the wear may be taken up by inserting a metal washer on the plug 13 between the blocks so as to space the blocks apart according to the amount of wear.

In Figs. 4 to 8 inclusive, a friction draft gear of substantially the same construction and operation as that shown in Figs. 1, 2, and 3 is illustrated, except that the wedge blocks 11ᵃ are made with flat intermediate engaging faces and a friction wear plate 20 is interposed laterally between the blocks. Since the wedge blocks 11 and 12 move laterally upon the opposite surfaces of the friction plate 20 in the operation of the gear, it will be evident that the area of frictional surface in action is thereby increased. If desired, the wedge blocks may bear directly against each other, or instead of making each wedge block element of two wedge blocks, said element may be in one piece, but it is preferable to employ the double wedge block construction, so that variations in the friction surfaces may be compensated for by adjustment of the wedge blocks, through relative lateral movement, to correspond with such variations.

One highly desirable feature of the present draft gear is that each of the draft gear springs has a compressive movement equal to the movement of the draw-bar, and this is important for the following reasons: Draft gear in which the springs have a compressive movement exceeding the draw-bar movement require friction surfaces of greater extent by reason of the corresponding increased movement of the friction elements, and such friction surfaces would be prohibitive on account of the limited space available in the draft gear for the friction elements. Furthermore, longer springs would be necessary for a given draw-bar movement, which would of course make such a construction prohibitive as a substitute for the old spring gear. On the other hand, if the compressive movement of the springs were less than the movement of the draw-bar, the full spring capacity of the draft springs would not be available. It should therefore be particularly noted that the longitudinal movement of the moving plunger wedge 14 is the same as the longitudinal movement of the moving follower plate 7. This is due to the fact that stress is transmitted from the moving plunger wedge through substantially parallel friction faces to the moving follower plate.

Having now described my invention, what I claim as new and desire to secure by Letters Patent, is:—

1. In a friction gear, the combination of a resistance spring, a friction element having oppositely inclined faces and movable in a direction to compress said spring, a centrally disposed wedge, another friction element having oppositely inclined faces but immovable in the direction to compress said spring, a second central wedge facing opposite to the first, and laterally and longitudinally movable wedge blocks interposed between the opposing inclined faces of the central wedges and said friction elements, the centrally disposed wedges being free from contact with said spring.

2. In a friction draft gear, the combination with a pair of oppositely disposed springs, of movable members arranged at the proximate ends of the springs, each having oppositely inclined friction faces, plunger wedges arranged longitudinally within the springs and having oppositely disposed friction faces, and wedge blocks interposed between the movable members and plunger wedges and having oppositely disposed friction faces for engaging the friction faces of said members and the friction faces of plunger wedges.

3. In a friction gear, the combination of a pair of resistance springs arranged in tandem, a pair of followers interposed between the proximate ends of said springs and each having oppositely inclined friction faces, a frame having stops engaging said followers in the normal release position, a pair of oppositely facing central wedges extending through the respective followers, and laterally and longitudinally movable wedge blocks interposed between the opposing inclined faces of the central wedges and said followers.

4. In a friction draft gear, the combination with a pair of tandem springs and a follower plate at the remote ends of the springs, of a plunger wedge arranged longitudinally within each spring and adapted to engage with the corresponding follower plate and each provided with friction faces at the proximate ends, and friction elements having friction faces for engaging the friction faces of the plunger wedges, one plunger wedge being held stationary by engagement with the adjacent follower plate under movement of the other plunger wedge through engagement with the other follower plate.

5. In a friction draft gear, the combination with springs arranged in longitudinal alinement, a follower plate at the opposite ends of each spring, and side plates adapted to be secured to the car center sills and provided with stops for each of the follower plates, of projections carried by the inner follower plates and extending into the restricted space formed by the inner stops and provided with oppositely inclined friction faces and elements having friction faces adapted to engage the friction faces of the inner follower plates.

6. In a friction draft gear, the combination with oppositely disposed springs, a follower plate at the opposite ends of each spring, and side plates adapted to be secured to the car center sills and provided with stops for each of the follower plates, of projections carried by the inner follower plates and extending into the throat formed by the inner stops and provided with oppositely inclined friction faces, a plunger wedge mounted within each spring and having a stem adapted to be actuated directly by the corresponding outer follower plate and provided with oppositely inclined friction faces, and wedge blocks interposed between the plunger wedges and the inner follower plate and provided with friction faces adapted to coöperate with the friction faces of the inner follower plates and the plunger wedges.

In testimony whereof I have hereunto set my hand.

EDWARD W. NEWELL.

In presence of—
A. M. CLEMENTS,
S. W. KEEFER.